United States Patent [19]
Groen, Jr.

[11] 3,752,057
[45] Aug. 14, 1973

[54] PORTABLE SCRAPER-TYPE MIXER
[75] Inventor: Frederick H. Groen, Jr., River Forest, Ill.
[73] Assignee: Dover Corporation, New York, N.Y.
[22] Filed: Nov. 2, 1971
[21] Appl. No.: 194,868

[52] U.S. Cl.................... 99/348, 259/65, 259/106
[51] Int. Cl....... A47j 43/07, A47j 43/08, B01f 7/02
[58] Field of Search .................... 99/348; 259/7, 22, 259/42, 65, 106, DIG. 26; 15/246.5

[56] References Cited
UNITED STATES PATENTS
| | | | |
|---|---|---|---|
| 1,618,650 | 2/1927 | Gilchrist | 259/DIG. 26 |
| 2,452,142 | 10/1948 | Pecker | 99/348 X |
| 2,514,999 | 7/1950 | Goldsbrough | 259/42 |
| 2,470,691 | 5/1949 | Erickson et al. | 259/106 |
| 3,197,180 | 7/1965 | Bates | 259/7 |

FOREIGN PATENTS OR APPLICATIONS
145,230  7/1920  Great Britain ..................... 259/106

Primary Examiner—John Petrakes
Assistant Examiner—Philip R. Coe
Attorney—Howard H. Darbo, Edward C. Vandenburgh et al.

[57] ABSTRACT

A mixer for a kettle has a shaft extending into the kettle at an angle of 30° with respect to the vertical axis of the kettle. A hoop is attached to the shaft and spaced a uniform distance from the bottom walls of the kettle. Pivotally mounted on this hoop are a plurality of scrapers. These scrapers are at different positions with respect to the walls of the kettle and at different inclinations with respect to the shaft axis. Each scraper is pivotally mounted on the hoop with stops to limit the extent of pivotal movement. Interchangeable scrapers are provided for different mixing operations.

12 Claims, 6 Drawing Figures

Patented Aug. 14, 1973

INVENTOR:
FREDERICK H. GROEN, JR.
By Darbo, Robertson & Vandenburgh
Attorneys

INVENTOR:
FREDERICK H. GROEN, JR.
By Darbo, Robertson & Vandenburgh
Attorneys

PORTABLE SCRAPER-TYPE MIXER

BACKGROUND AND SUMMARY OF THE INVENTION

The present invention is directed toward providing a mixer which can be used with large cooking kettles for performing a variety of the stirring or mixing operations involved while foods are being heated and/or cooked therein. While embodiments of the invention are particularly suited for use in cooking operations, these embodiments also have application in various chemical processes which require mixing.

There are many cooking operations which involve the heating of product in conjunction with a mixing operation. For example, a few would be: the brazing of cube meat for stew; the forming of mashed potatoes from a dry potato mix and water; the preparing of a roux for use in gravies, sauces, puddings, etc.; the preparation of pie fillings; etc. In many installations, such as hotels, restaurants, airline kitchens, etc., such products are prepared in large quantities in large heated kettles, e.g., a 40 gallon size kettle. Obviously, the mixing operation of such a quantity is laborious if performed by hand. Power driven mixers are available, but, in general, the axis of the rotating shaft is coincident with the vertical axis of the kettle. There have been some prior art mixers that have these two axes separated to a relatively small extent; that is, the shaft axis inclined at about fifteen degrees to the kettle axis. With these prior art types of mixers a substantial amount of apparatus is required in order for it to do an effective job of blending the product in the kettle. That is, invariably they require a stator, counter-rotating blades, etc., in order to do an effective mixing and blending job.

The principal object of the present invention is to provide a mixer extending down into an open top kettle, which mixer not only will scrape the kettle walls to displace the material positioned adjacent those walls, but which will, with only a simple rotating head, also intermingle the various portions of the product, that is, mix and blend the product within itself. This is achieved primarily by inclining the axis of the shaft at least 25° with respect to the vertical axis of the kettle. This results in product from the bottom of the kettle being lifted up to the vicinity of the top of the kettle with the opportunity for product at the top of the kettle to flow downwardly and into contact with the heated surfaces in the area of the bottom of the kettle. There is a mixing and blending of the product within itself. The configuration and positioning of the scrapers also contribute to achieving this desired result.

Further object and advantages will become apparent from the following description.

DESCRIPTION OF SPECIFIC EMBODIMENT

Figure 1:
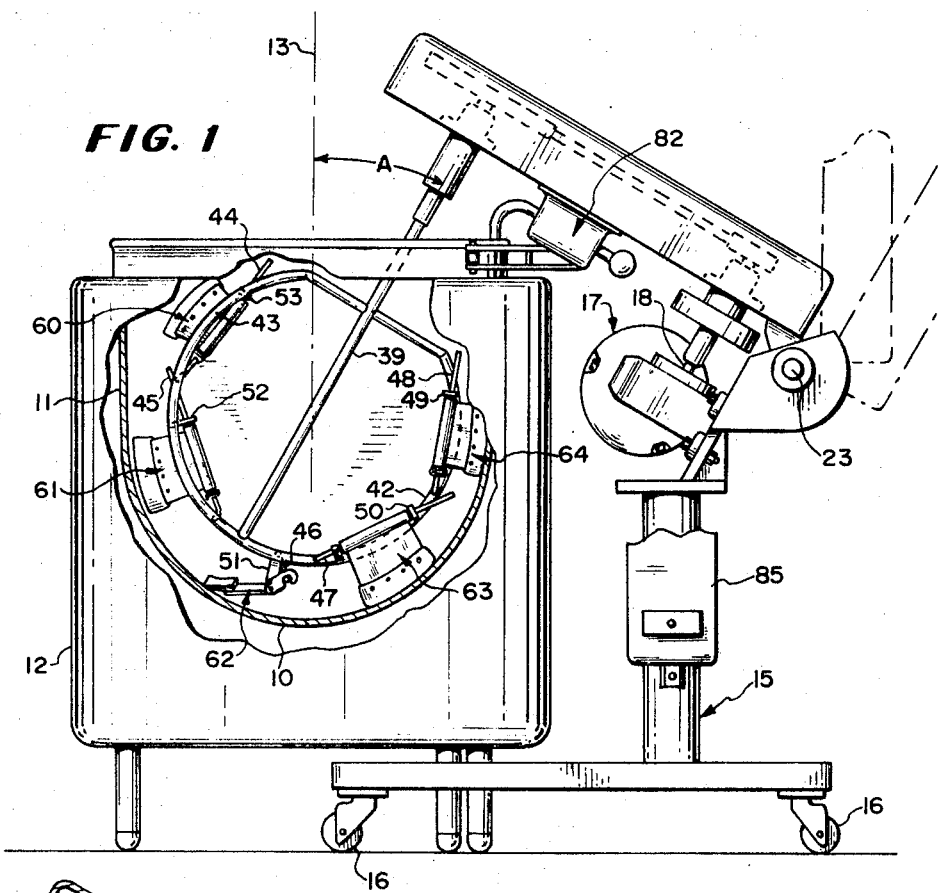
FIG. 1 is a side elevation, partially broken away, of an embodiment of the invention used in conjunction with a cooking kettle.
Figure 2:
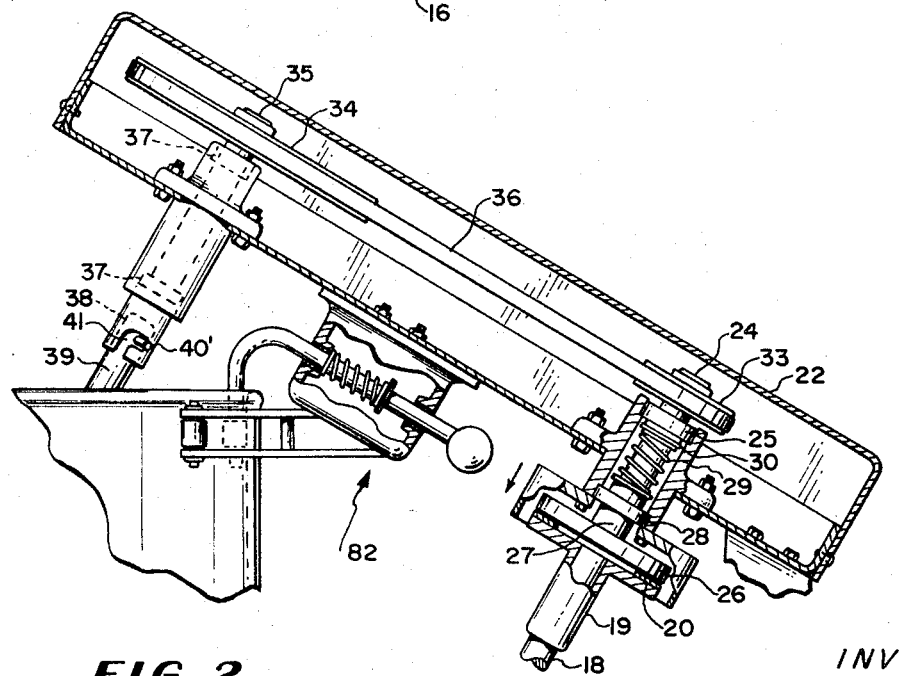
FIG. 2 is an enlarged sectional view of the power head.

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

The present invention is for use with a kettle having walls defining a semi-spherical bottom 10 and a cylindrical upper portion 11. These are concentric about an axis 13. In the illustrated embodiment, this kettle is enclosed in a jacket 12 so that a heated fluid, e.g., steam, can be brought into contact with the kettle to heat the same. Such kettles are prior art. The mixer includes a frame, generally 15. In the illustrated embodiment this frame is mounted on casters 16 so that it can be moved about and used in conjunction with various kettles. However, in some embodiments, the frame 15 will be unitary with the kettle and/or its jacket.

A gear head motor 17 drives a shaft 18. Secured to the shaft 18 is a clutch half 19 having a clutch lining 20. A power head includes a sub-frame 22 in the form of a housing. This sub-frame is pivotally connected to the main frame for pivotal movement about the axis of a pin 23. Within the sub-frame a shaft 24 is rotatably mounted in a bearing 25. A clutch half 26 includes a sleeve 27 which is rotatably mounted in a bearing 28. Sleeve 27 is splined to shaft 24 so that they are rotatably engaged, while permitting the sleeve to move axially with respect to the shaft. A spring 29 bears against the sleeve 27 at one end and against an abutment 30 at the other. This urges the clutch half 26 into contact with the clutch lining 20 on clutch half 19.

A pulley 33 is secured to shaft 24. A pulley 34 is secured to a shaft 35. A vee belt 36 connects the two pulleys 33 and 34. Shaft 35 is journaled in bearings 37. Shaft 35 has an external socket 38 to releasably receive the end of the mixing head shaft 39. Pin 40 is received in a slot 41 on the socket body to releasably couple the shaft 39 in socket 38. The mixing head includes a pair of curved supports 42 and 43. On support 43 are two pins 44 and 45. On support 42 are three pins 46, 47 and 48. Each pin has a proximal end welded to the respective support and a distal end which extends out freely. Brackets 49, 50, 51, 52 and 53 releasably engage the respective pins adjacent the distal ends. Secured to pin 44 are a pair of stops 54. A pair of spaced stops 55 are secured to pin 45. A pair of stops 56 are secured to pin 46. A pair of stops 57 are secured to pin 47 and a pair of stops 58 are secured to pin 48. Pivotally mounted on the respective pins 44–48 are scrapers, generally 60–64.

Figure 4:
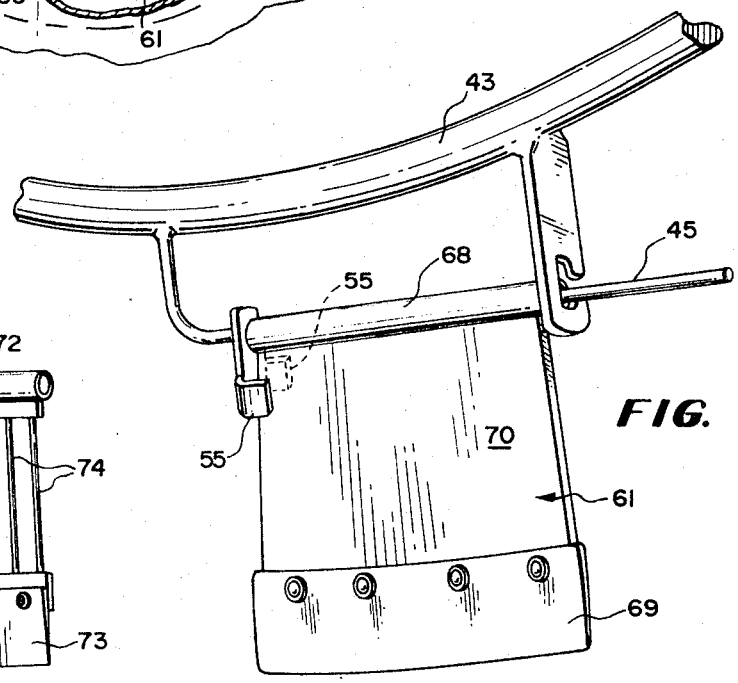
FIG. 4 is an enlarged perspective view of one of the scrapers.

The structure of these scrapers is best seen with reference to FIG. 4. Each consists of a proximal end in the form of a cylindrical mount 68. This mount is journaled on the respective pin, e.g., 45. At the distal end of the scraper is a blade 69. Preferably, this blade is plastic such as Delrin or nylon. A plate 70 is welded to mount 68 and riveted to the blade 69. The plate 70 fits between stops 55 so that the stops limit the extent of pivotal movement of the blade. Scrapers 60–64, respectively, have the following ranges of movement: 40°; 30°; 43°; 30°; and 45°.

The stops, e.g., 55, hold the scrapers so that as they move toward and away from the kettle walls they will stay in approximately the same position with respect to the axis of shaft 39. However, the range of movement is sufficient so that the blades, e.g., 69, will maintain good contact with the kettle walls at the portion of the path at which this is to occur. The pressure of the product against the plate 60 serves to urge the blade 69 into contact with the kettle walls.

Figure 5:
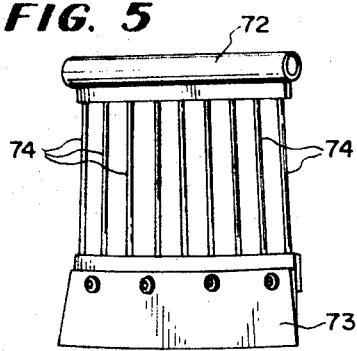
FIG. 5 is a perspective view of an alternative form of scraper.

FIG. 5 illustrates an alternative form of scraper. This comprises a cylindrical mount 72 at the proximal end and a blade 73 at the distal end. Connecting the two ends are a plurality of spaced bars 74 defining openings therebetween.

Figure 6:
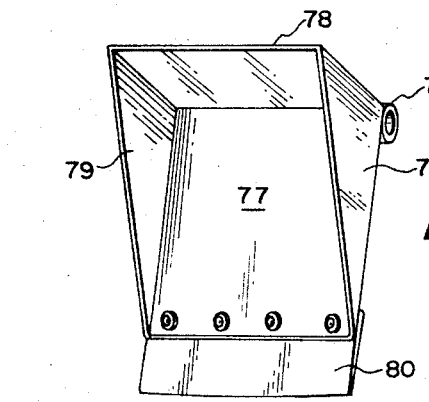
FIG. 6 is a perspective view of still another form of scraper.

Another alternative embodiment is illustrated in FIG. 6. Again, there is a cylindrical mount 76 to which is welded a "scoop" in the form of a plate 77 having a back 78 and sides 79. A blade 80 is positioned at the distal end and riveted to the plate 77.

Figure 3:
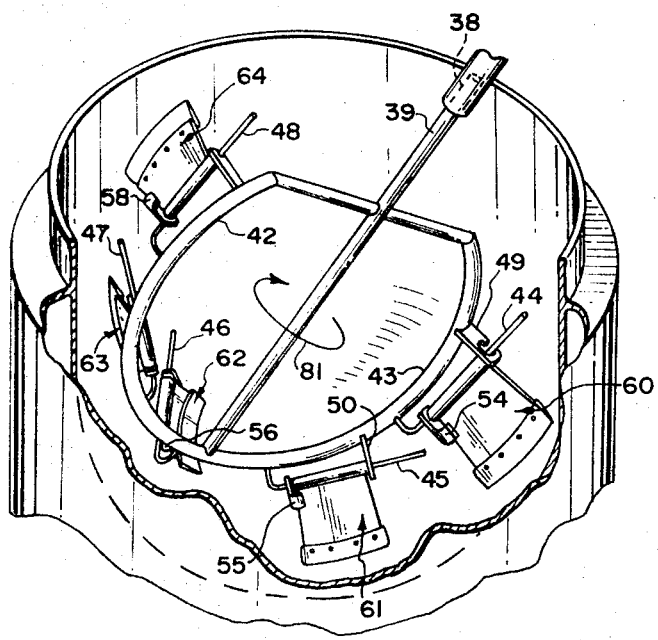
FIG. 3 is a perspective view partially broken away showing the scrapers in the kettle.

The shaft 39 and thus the scrapers, etc., rotate in the direction indicated by arrow 81 in FIG. 3. As previously mentioned, the shaft 39 is inclined with respect to the vertical axis 13 of the kettle by at least 25°. This is illustrated by the dimension A in FIG. 1. In the illustrated embodiment, the inclination is thirty degrees and this has proven to be eminently satisfactory. As a result of this rotation (and their varying positions on supports 42, 43), the scrapers move along individual paths. A portion of each path is adjacent the bottom wall 10 at which time the scrapers ride on that bottom wall. Thereafter, at least some of the scrapers rise through the product in the kettle creating a lifting action (particularly with the FIG. 4 and FIG. 6 scrapers) of this product. Some of the scrapers actually move away from the wall 10, 11 at the top of their path of movement.

Each of the scrapers are individually positioned in that they follow a different path during the rotation of the mixing head. To this end the inclination of the pivotal axes (pins 44-48) are all different with respect to the axis of shaft 39 (see particularly FIG. 1). The scrapers are at different elevations along the shaft axis. Thus scraper 62 moves in a generally circular path at the very bottom of the kettle. Scraper 61 moves about a path immediately above that of scraper 62. Scraper 63 moves along a path immediately above that of scraper 61. The next higher path is defined by scraper 60 and the highest path is defined by scraper 64. However, it is important to note that there is a substantially vertical component to the paths of movement of at least the top four scrapers. This results in a lifting action. The extent of this lifting action will vary with the scrapers because of the different positioning thereof. This substantially nullifies the tendency of the product in the kettle merely to rotate about the shaft axis.

The speed of rotation will be varied by the operator to suit the conditions under which the mixer is being used. Provision is made for varying the speed as by the use of a variable speed control for the motor. This control is included in a control box 85. For example, with a forty gallon kettle, a mixer having a speed range of from 20 to 80 rpm will be eminently satisfactory. With larger kettles a lower rotational speed would be employed so as to roughly maintain the same peripheral speed in feet per minute. Similarly, with a smaller kettle, the rotational speed would be increased so as to generally maintain the same range of peripheral speeds.

For cleanliness purposes, the parts that would be in contact with the product would be made of stainless steel or plastic. As illustrated in dot-dash lines in FIG. 1, the power head can be pivoted upwardly to raise the mixer from the kettle. Preferably, the motor should be turned off before this is done. However, if it is done with the motor turned on, the clutch 19, 20, 26 will disengage thus stopping the rotation of the mixer. Other forms of clutches, i.e., disengaging means, may be employed to serve the same purpose. The mixer can be removed from the power head for washing. A latch, generally 82, is provided to releasably connect the power head with the kettle. If the mixer is to be moved to another kettle, the latch 82 is disengaged (by pushing in on it and turning it) whereupon the mixer can be moved along the floor on its casters to the other kettle.

One feature that is important is the positioning of the motor relatively low on the base rather than on the top power head. This keeps the weight low with little likelihood that an upset will occur when the power head is tipped to remove the mixer from the kettle.

The simplicity of the overall construction is extremely important. The mixing head 39-64 is much less than is required in the conventional machines to obtain an effective blending of the product. There are no stators or counter-rotating blades. The overall assembly is relatively light in weight.

I claim:

1. A mixing apparatus for use with a kettle having a bottom wall which is approximately semi-spherical about a vertical axis with an upper wall which is approximately cylindrical about said axis and a top opening about said axis into which opening the apparatus extends, said apparatus comprising a power driven shaft rotatable about an axis, a plurality of individual scrapers, and means attaching said scrapers to said shaft so that the scrapers move in paths about said axis, the improvement comprising:
    said scrapers having relatively wide blades;
    said shaft axis being inclined at least 25° with respect to said vertical axis and positioning said scraper blades to contact said bottom wall during a part of their paths of movement, whereby some of said scraper blades move away from the wall after said contact as they move about said axis.

2. A mixing apparatus for use with a kettle having a bottom wall which is approximately semi-spherical about a vertical axis with an upper wall which is approximately cylindrical about said axis and a top opening about said axis into which opening the apparatus extends, said apparatus comprising a power driven shaft rotatable about an axis, a plurality of scrapers, and means attaching said scrapers to said shaft, the improvement comprising:
    said shaft axis being inclined at least 25° with respect to said vertical axis and positioning said scrapers to contact said bottom wall whereby some of said scrapers move away from the wall as they move about said axis, said scrapers being movable with respect to the shaft, said means limiting the amount of said movement.

3. An apparatus as set forth in claim 2, wherein said means includes a plurality of mounting rods, one for each of said scrapers, each scraper being pivotally mounted on the respective rod, and a pair of stops for each rod and positioned to limit the pivotal movement of the respective scraper both forward and backward.

4. An apparatus as set forth in claim 2, wherein said means includes a plurality of mounting rods, one for each of said scrapers, each scraper being pivotally mounted on the respective rod, each of said rods being at a different inclination with respect to the shaft axis and at a different elevation with respect to said walls.

5. An apparatus as set forth in claim 2, wherein said means includes a plurality of mounting rods, one for each of said scrapers, each scraper being pivotally mounted on the respective rod, each of said rods having a fixed proximal end and a free distal end, and latch means for each rod and engaging the rod adjacent the distal end, and releasable to permit the rod to be disengaged therefrom.

6. A mixing apparatus for use with a kettle having a bottom wall which is approximately semi-spherical about a vertical axis with an upper wall which is approximately cylindrical about said axis and a top opening about said axis into which opening the apparatus extends, said apparatus comprising a power driven shaft rotatable about an axis, a plurality of scrapers, and means attaching said scrapers to said shaft, the improvement comprising:
said shaft axis being inclined at least 25° with respect to said vertical axis and positioning said scrapers to contact said bottom wall whereby some of said scrapers move away from the wall as they move about said axis, same means releasably holding each scraper whereby the scrapers may be removed and replaced, and including a plurality of styles of scrapers usable alternatively.

7. An apparatus as set forth in claim 6, wherein one style of scraper includes a mount at the proximal end, a blade at the distal end, and a plate between said blade and mount; and another style of scraper includes a corresponding mount at the proximal end, a corresponding blade at the distal end, and a plurality of spaced bars connecting the blade and mount thereof.

8. An apparatus as set forth in claim 6, wherein one style of scraper includes a mount at the proximal end, a blade at the distal end, a plate between said blade and mount, a back at the mount end of the plate and upstanding with respect to the plate, and upstanding sides at the edges of the plate and connecting with said back.

9. An apparatus as set forth in claim 2, wherein said means comprises two curved supports secured to said shaft, said supports being substantially a uniform distance from said bottom wall as said shaft rotates, a scraper mount means for each of said scrapers, each scraper mount means pivotally connecting the respective scraper to a support for movement about a pivotal axis, said pivotal axes being at a variety of inclinations with respect to the shaft axis.

10. In a mixing apparatus for use with a kettle having a bottom wall which is approximately semi-spherical about a vertical axis with an upper wall which is approximately cylindrical about said axis and a top opening about said axis into which opening the apparatus extends, said apparatus comprising a frame, a motor mounted on said frame, a shaft rotatable about an axis, a plurality of scrapers, and means attaching said scrapers to said shaft, the improvement comprising:
said shaft axis being inclined at least 25° with respect to said vertical axis and positioning said scrapers to contact said bottom wall portion whereby some of said scrapers move away from the wall as they move about said axis;
a power head pivotally mounted on the frame, said shaft being connected to said power head, said head being pivotal between a first position at which said means and scrapers are in said kettle to a second position at which they are displaced therefrom; and means connecting said motor and said shaft at the power head for driving said shaft, said means including a clutch which is automatically disengaged when said power head is moved away from the first position and is engaged when the power head is moved to the first position.

11. A mixing apparatus for a kettle having an open top, said apparatus comprising:
a mixing head including a shaft rotatable about an axis, said axis being inclined with respect to the vertical, a plurality of scrapers and means for mounting said scrapers;
a frame;
a motor mounted on said frame;
a power head pivotally mounted on the frame, said shaft being connected to said power head, said head being pivotal between a first position at which said means and scrapers are in said kettle to a second position at which they are displaced therefrom; and
means connecting said motor and said shaft at the power head for driving said shaft, said means including a clutch which is automatically disengaged when said power head is moved away from the first position and is engaged when the power head is moved to the first position.

12. A mixing apparatus for use with a food preparation kettle having an open top and walls which define sides and a concave bottom with means for heating said walls, said apparatus comprising a power driven shaft rotatable about an axis which axis is inclined with respect to the vertical, the improvement comprising:
a plurality of supports attached to said shaft and having portions extending adjacent said walls;
a plurality of scrapers, said scrapers having blades at the distal ends thereof;
means connecting said scrapers to said portions and positioning said scrapers to follow a plurality of adjacent paths about said walls as said shaft rotates said supports, said blades being movable with respect to said supports, some of said scraper blades contacting said walls as they move along some portions of their respective paths, part of the paths of movement of some of said scrapers being upwardly because of the position of the scraper with respect to the shaft and the inclination of said shaft whereby the food in the kettle has a lifting motion imparted to it.

* * * * *

UNITED STATES PATENT OFFICE
CERTIFICATE OF CORRECTION

Patent No. 3752068           Dated August 14, 1973

Inventor(s) Herbert Tramposch and Daniel M. Kabak

It is certified that error appears in the above-identified patent and that said Letters Patent are hereby corrected as shown below:

Column 3 Line 25, change "materila" to --material--.

Column 6 Line 36, change "barcket" to --bracket--.

Claim 5, Column 8 Line 18, after wettable, insert --body--.

Signed and sealed this 15th day of April 1975.

(SEAL)
Attest:

RUTH C. MASON
Attesting Officer

C. MARSHALL DANN
Commissioner of Patents
and Trademarks